United States Patent [19]

Somerville

[11] 4,272,706

[45] Jun. 9, 1981

[54] MOORING WINCH SYSTEM

[75] Inventor: William M. Somerville, Newcastle, England

[73] Assignee: Northern Engineering Industries Limited, Newcastle upon Tyne, England

[21] Appl. No.: 954,434

[22] Filed: Oct. 25, 1978

Related U.S. Application Data

[63] Continuation-in-part of Ser. No. 853,787, Nov. 21, 1977, abandoned.

[30] Foreign Application Priority Data

Dec. 3, 1976 [GB] United Kingdom ............... 50622/76

[51] Int. Cl.[3] ...................... B65H 59/38; B65H 77/00; H02P 5/34; H02P 7/42

[52] U.S. Cl. ........................................ 318/6; 318/802; 318/809

[58] Field of Search .................... 318/6, 775, 777, 798, 318/799, 800, 801, 802, 803, 805, 807, 810, 811, 812

[56] References Cited

U.S. PATENT DOCUMENTS

| | | | |
|---|---|---|---|
| 3,421,736 | 1/1969 | Ostrom | 318/6 |
| 3,476,995 | 11/1969 | Mueller et al. | 318/6 |
| 3,584,278 | 6/1971 | Krabbe | 318/777 |
| 3,671,832 | 6/1972 | Salihi | 318/800 |
| 3,683,246 | 8/1972 | Warshaw et al. | 318/6 |
| 3,774,883 | 11/1973 | Ostrom | 318/6 X |
| 3,872,364 | 3/1975 | Hubner | 318/802 X |
| 4,048,547 | 9/1977 | Havard et al. | 318/6 X |
| 4,078,191 | 3/1978 | Morters et al. | 318/799 |
| 4,145,645 | 3/1979 | Price et al. | 318/777 X |

FOREIGN PATENT DOCUMENTS

| | | | |
|---|---|---|---|
| 2320748 | 11/1974 | Fed. Rep. of Germany | 318/803 |
| 131888 | 7/1978 | Fed. Rep. of Germany | 318/6 |
| 442561 | 9/1975 | U.S.S.R. | 318/802 |

OTHER PUBLICATIONS

D. W. Miller and R. G. Lawrence, "Variable Frequency Invertor Motor Drives", in Electronics & Power for 10/1976 at pp. 675–678.

*Primary Examiner*—J. V. Truhe

*Assistant Examiner*—Richard M. Moose

[57] ABSTRACT

A mooring winch system in which automatic mooring duty is performed by a winch having an AC motor fed from the supply via a converter which includes a DC to AC inverter, the convertor producing a balanced three-phase square, quasi-square, sinusoidal or quasi-sinusoidal output. The motor thus can stall indefinitely, be driven in the sense of rope payout by tension force in the mooring rope, or run in the opposite sense to recover rope, without exceeding its rated temperature for that duty. Rope recovery is adequate both for normal duties and also where higher speeds of recovery are required and rope tension is maintained substantially constant throughout.

8 Claims, 6 Drawing Figures

MOORING WINCH SYSTEM

This application is a continuation-in-part of my application Ser. No. 853,787, filed Nov. 21, 1977, for Mooring Winch System now abandoned.

BACKGROUND OF THE INVENTION

The invention relates to automatic mooring winch systems.

It is known to use a mooring winch to bring a ship to a berth at which it is to be moored and then to hold the ship at the berth using the winch to perform automatic mooring duty. During the automatic duty, the winch is required to maintain tension in the mooring rope at all times. Wind and movements of water due to tide, current or other effect cause movements of the ship which can be resisted only up to the limits of safe tension in the mooring rope and the winch is set to pay out rope should the tension rise to the limit. The winch is arranged to recover rope as soon as the tension reduces so that at no time does the tension in the rope fall to zero.

At present, known winches used for automatic duty are either steam driven or, if electric, usually have DC drive motors. It is advantageous to eliminate maintainance of ships' deck equipment wherever possible. Steam winches entail maintainance of many mechanical parts and of insulation of long steam lines on deck. DC winches entail maintainance of Ward-Leonard drive equipment.

A mooring winch capable of automatic duty is known having an AC motor, but a load sensor is necessary and the motor and winch brake must be energised or de-energised repeatedly which leads to frequent maintainance work.

A mooring winch having an AC motor was proposed in U.S. Pat. No. No. 3,774,883 in which in a first system the winch motor is energised for automatic mooring duty from an AC source at a frequency of some 30 cycles per second. The system described is such that constant tension is maintained at extremely low speeds of motor operation only at or near stalled condition of the motor, which is energised continuously in the rope in-haul sense during automatic mooring duty.

This is emphasised in U.S. Pat. No. 3,774,883, which proposes a second system for towing applications in which fluctuations in tension have to be avoided. Clearly, when towing duty is undertaken it is unlikely that the winch motor can remain at or near its stalled condition and will be required to run at higher speeds.

In that second system therefore, it is proposed in U.S. Pat. specification to use a scope sensor which in response to rotation of the winch drum changes the resistance in the circuit of a DC current source supplying the rotor field of an alternator. The alternator has a stator winding at which a voltage is derived and fed to the winch motor.

Thus, as the sea conditions force the winch to pay out rope the scope sensor causes an increase in voltage to be fed from the alternator stator winding to the winch motor and the rope tension is increased, tending to haul rope in.

Clearly, even with this arrangement the rope tension is not maintained truly constant but fluctuates considerably, the greater the change in rope length, the greater the tension fluctuations will be.

The systems described in U.S. Pat. No. 3,774,883 employ in addition to the winch motor, a second AC induction motor which directly drives an alternator and which is also mechanically coupled to an AC squirrel-cage motor. The latter is driven idly during automatic mooring duty but is used to drive the second induction motor referred to above when high-speed in-haul of rope is required.

The system described in U.S. Pat. No. 3,774,883 is therefore extremely bulky and requires a great deal of mechanical maintainance. It does not make use of any electronic control circuitry to achieve a compact and seaworthy system.

Furthermore, the system requires additional cooling fans or fans to dissipate the heat generated in the resistance grid banks and in the second induction motor and the squirrel cage motor.

Motors other than for mooring winch applications are required to run in a given sense of rotation only and are energised in that sense only. Suitable energisation currents and voltages may be derived from a supply for such motors by what are generally known as "motor drives".

It has been proposed by D. W. Miller and R. G. Lawrence in "Electronics & Power" for October 1976 at pages 675 to 678 that such motor drives should be such as to produce quasi-square-wave outputs using rectification, chopper and inverter techniques or to produce synthesised sine waveform outputs using pulse width modulation techniques.

It should be noted that, as proposed by Miller and Lawrence, the motor duty required is solely drive motor duty, the motor being required to produce torque only in the sense of energisation. Furthermore, the motor has only a single duty to perform and each of the motor drive systems proposed gives an output which energises the motor throughout the entirety of its duty.

It should also be noted that in the case of quasi-square-wave outputs, Miller and Lawrence propose that thyristors in the inverter stage should each turn on for a period of 180 electrical degrees.

It should further be noted that Miller and Lawrence are especially concerned with speed control and they teach that a lower speeds motor frame size must be increased or forced cooling must be used to avoid excessive temperature rise in the motor.

However, Miller and Lawrence do not contemplate any application of inverter techniques beyond motor drive applications and in particular they do not contemplate or consider energisation of a motor in non-drive conditions i.e. in stalled non-rotary conditions; and the condition in which the motor is required to produce torque to resist motion of the load. The latter condition is not one in which the motor functions as a drive motor but rather one in which the motor is also obliged to resist the rotation impressed upon it and produces torque in a sense opposite to that in which it is being energised.

The invention goes beyond the proposals of Miller and Lawrence who consider the motor producing torque only in the same sense as that of energisation and only at speeds above some 5% of full rated synchronous speed. For example, above 75 revolutions per minute (see FIG. 4 of Miller and Lawrence reference).

By contrast I have found that inverter means may be successfully used to energise continuously an AC winch motor at zero speed (stalled stationary condition) and at low negative speeds, where the motor produces torque in a sense opposite to the sense of energisation and at low positive speeds so as to perform automatically the normal automatic mooring duty.

I have found that such continuous energisation enables the motor to produce adequate torque without excessive temperature rise. I have also found the motor response to changing conditions is excellent; that constant tension can readily be maintained in the rope paying out sense up to the highest speeds likely to be encountered during automatic mooring duties; and that rope recovery is readily catered for up to the highest speeds likely to be encountered during automatic mooring duties.

BRIEF SUMMARY OF THE INVENTION

An object of the invention is to provide an automatic mooring winch system in which the mooring winch has an AC motor and the system having means by which the motor can continuously be energised so as to provide for automatic mooring duty without the use of sensors monitoring rope tension or movement.

The invention enables the same motor to perform mooring duties running at a relatively higher speed and also to perform automatic mooring duties requiring the winch to pay out mooring rope, remain stationary, or recover mooring rope while at all times maintaining the mooring rope tensioned. The invention enables the motor to operate at relatively lower speeds during automatic mooring duty and to remain in stalled conditions indefinitely without excessive temperature rise.

BRIEF DESCRIPTION OF THE DRAWINGS

Examples of systems will now be described to illustrate the invention with reference to the accompanying drawings, in which.

DETAILED DESCRIPTION

Figure 1:
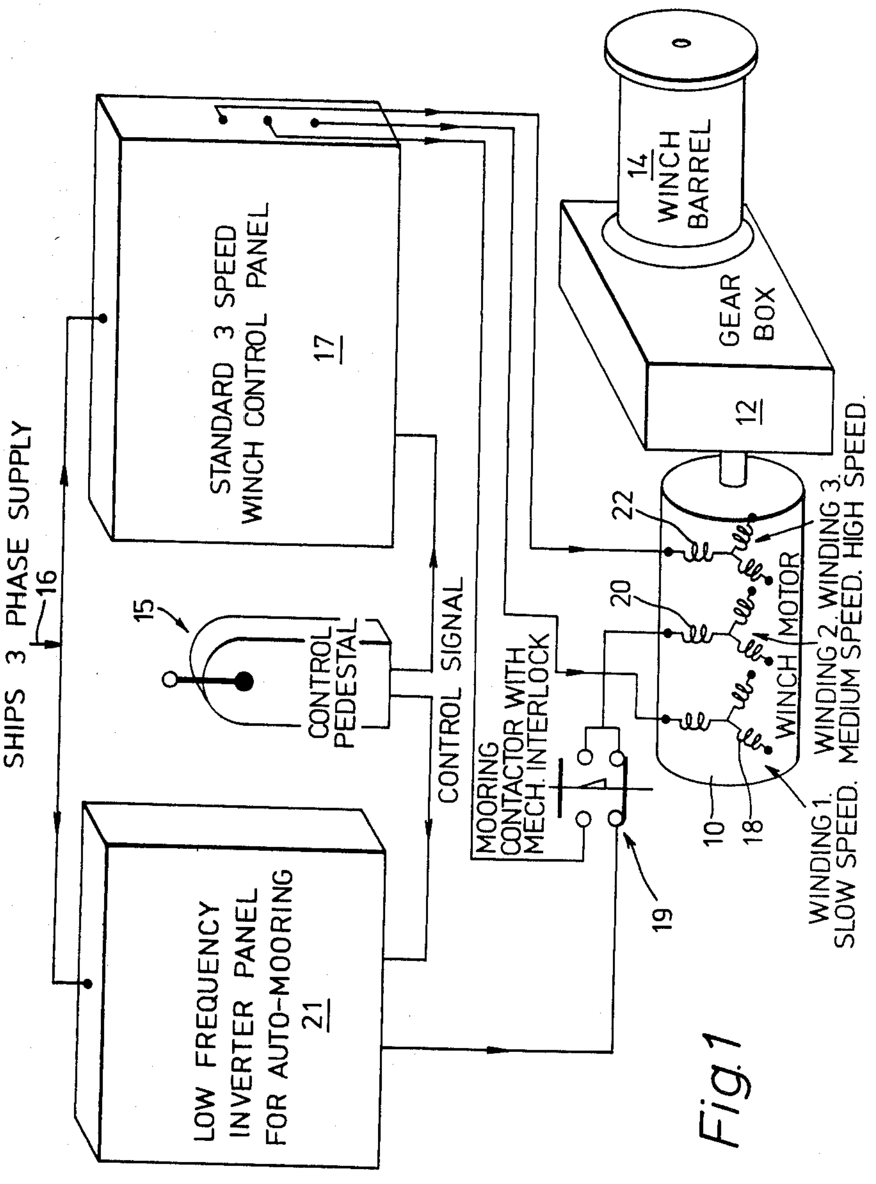
FIG. 1 is a schematic diagram showing the main parts of a first form of mooring winch system.

FIG. 1 shows a mooring winch system in which the winch comprises an AC squirrel-cage induction motor 10 which is coupled by a reduction gear train at 12 to a winding drum 14. A rope (not shown) has one end secured to the drum 14 and is wound about the drum 14. When a ship, on which the winch system is mounted, is to be moored at a berth the rope is paid out and its other end is secured to a bollard ashore. The rope is then hauled in to assist in bringing the ship safely to its required berthed position. Typically, the ship would have several such winch systems and several ropes would be secured ashore.

The hauling in of the rope in each case is effected by manual control on the winch using a manual controller 15. The winch motor 10 during this mooring duty is fed from a 3-phase 440 volt, 60 hertz AC mains supply 16. The motor 10 is a 3-speed pole-changing standard type of motor and the motor stator has three star-windings 18, 20, 22 which provide, respectively, 24 electromagnetic poles for the low speed; 8 poles for the medium speed; and 4 poles for the high speed. The synchronous medium speed of the motor 10 is 900 revolutions per minute (r.p.m.). The rated torque at the medium speed setting is produced at 870 r.p.m. That is, the rated slip speed is 30 r.p.m. equivalent to a slip-frequency of 2.00 hertz.

The three speed settings may be manually selected from a control panel 17 to initiate operation of the relevant set of contactors by which the mains supply 16 is fed to the relevant stator winding.

Once the ship is berthed, the ship is required to be kept in, or as close as possible, to that berthed position by the mooring ropes of the several winches.

Each rope is required to be maintained tensioned at all times but when forces on the ship, due to wind and to water movements, cause the tension in any rope to increase to the set safe tension, the winch system is required to pay out rope maintaining tension but preventing an excessive increase in tension which would otherwise lead to rope failure or other damage to the system. Upon a decrease in disturbing forces and a corresponding tendency to a decrease in rope tension, the winch system is required to recover rope maintaining tension and restoring the ship's position to its correct status. Thus, tension is maintained at a required value while the rope is stationary, or while it is paid out or while it is recovered. This duty is performed automatically in each case by the corresponding mooring winch system. A switch contactor 19 is moved over to lock out the operation of the change speed contactors referred to above and to initiate energisation of automatic mooring energisation of the winch motor 10.

In this example, the medium speed winding 20 of the motor 10 is energised for automatic mooring duty. The winding 20 is energisable from the mains supply 16 by a converter means 21 which is shown in detail in FIGS. 2 and 3. Such continuous torque is always in the rope in-haul sense regardless of the direction of rotation of the motor. In other words the torque is always such as to pull the rope to maintain tension.

Figure 4:
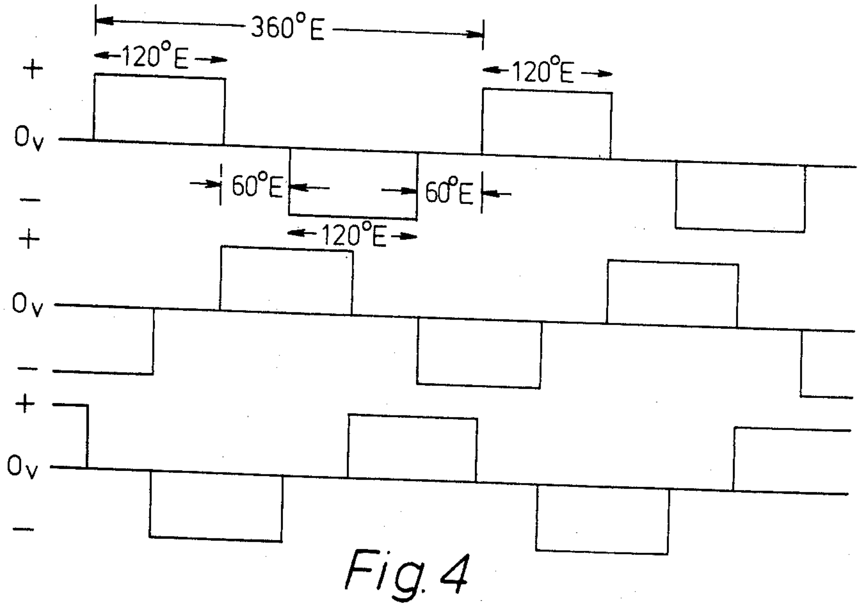
FIG. 4 is a diagram showing the voltage waveforms produced by the converter means of the system shown in FIG. 1.

The converter means converts the AC voltage supply into a 3-phase supply which in this example is of quasi-square waveform. That is to say, when the motor draws current from the converted supply, the waveform of the voltage driving the current is of quasi-square type. It has, in each phase, a positive period followed by a zero voltage period, followed by a negative period equal to the positive period, followed by a zero period and so on. The three phase voltage waveforms are shown in FIG. 4. The positive and negative "on" periods are of 120 degrees electrical duration and the zero or "off" voltage periods are of 60 degrees electrical duration. The three phases are mutually out-of-phase by 120 degrees electrical. I have found that this regime of waveform in each phase is especially advantageous in reducing unwanted current harmonics in the motor winding.

The AC mains voltage is stepped down in the convertor and three values are manually selectable at the control panel namely 20 volts root-mean-square value (r.m.s.); 25 volts (r.m.s.) and 35 volts (r.m.s.). These values allow a choice from three different automatic mooring tension settings. The converter means converts the AC voltage to DC voltage and then, by means of a 3-phase thyristor bridge inverter, produces the final output as a 3-phase quasi-square waveform voltage the value of which correspondingly may be 20, 25 or 35 volts (r.m.s.).

The frequency of the final output from the converter means is, in this example, 2 hertz; that is, it is equal to the rated slip-frequency for the mdium speed winding as explained above.

I have found that the automatic mooring duty is achieved very effectively by such energisation of the motor. For example, while the ship is stationary at its required berthed position, the motor is energised to maintain the set tension in the rope but the motor rotor does not turn. The motor is stalled. I have found that this stalled condition of the standard motor can be maintained throughout the duration of any required period of automatic mooring duty without the motor temperature exceeding the rated value. The system is thus applicable in all climatic conditions.

In the stalled condition, the equality between the supply frequency and the rated slip-frequency means that the currents in the stalled rotor are the same as they would be were the motor running on full load at the rated full torque running speed i.e. at 870 r.p.m. in this example. The heating effects from those rotor currents are also the same.

Furthermore, the stator current needed to produce the rated torque under the stalled condition is approximately the same as rated full load current at 870 r.p.m. running condition, so that copper losses are the same.

However, since the line voltage is very much reduced, the kilovoltamperes (kVA) value is reduced in proportion. Thus during stalled automatic mooring duty the power consumed is less than that consumed during normal mooring duty at the same torque.

The stator iron losses due to hysteresis and eddy currents are related to the energisation frequency and are thus greatly reduced at the low frequency used. Since automatic mooring duty is performed at relatively low speeds, the friction and windage losses are also relatively reduced.

The reduction in losses explained above apparently fully compensates any losses arising from the presence of higher harmonic components in motor currents and I have found that a standard motor equipped with a standard independent fan can perform automatic mooring duty under all conditions without the need for additional cooling.

I have found that the motor also very effectively produces torque in the sense to maintain tension when energised as described even when the winch drum is forced to render (i.e. to pay out rope) to prevent excessive rise in tension when wind or water forces cause the ship to move. The motor 10 is then forced to turn in a negative sense that is, opposite to that sense in which the motor as energised from the converter would turn if free of load. However, even in this condition the motor temperature does not exceed the rated value and it is important to note that the motor is still producing torque in the rope in-haul sense.

I have also found that when the disturbing forces decrease, the motor 10 effectively runs in the positive sense to drive the winch drum so as to haul rope in and maintain tension therein. The motor temperature continues to remain below the rated level. I have found that for the conditions found at most berths the speed of the motor is sufficient to prevent slackening of the rope. In other words, ship movements generally are not more rapid than the speed at which the motor can drive the drum to haul the rope in.

I describe later modifications for use in special circumstances where the speed of ship movements may be relatively greater.

Figure 2:
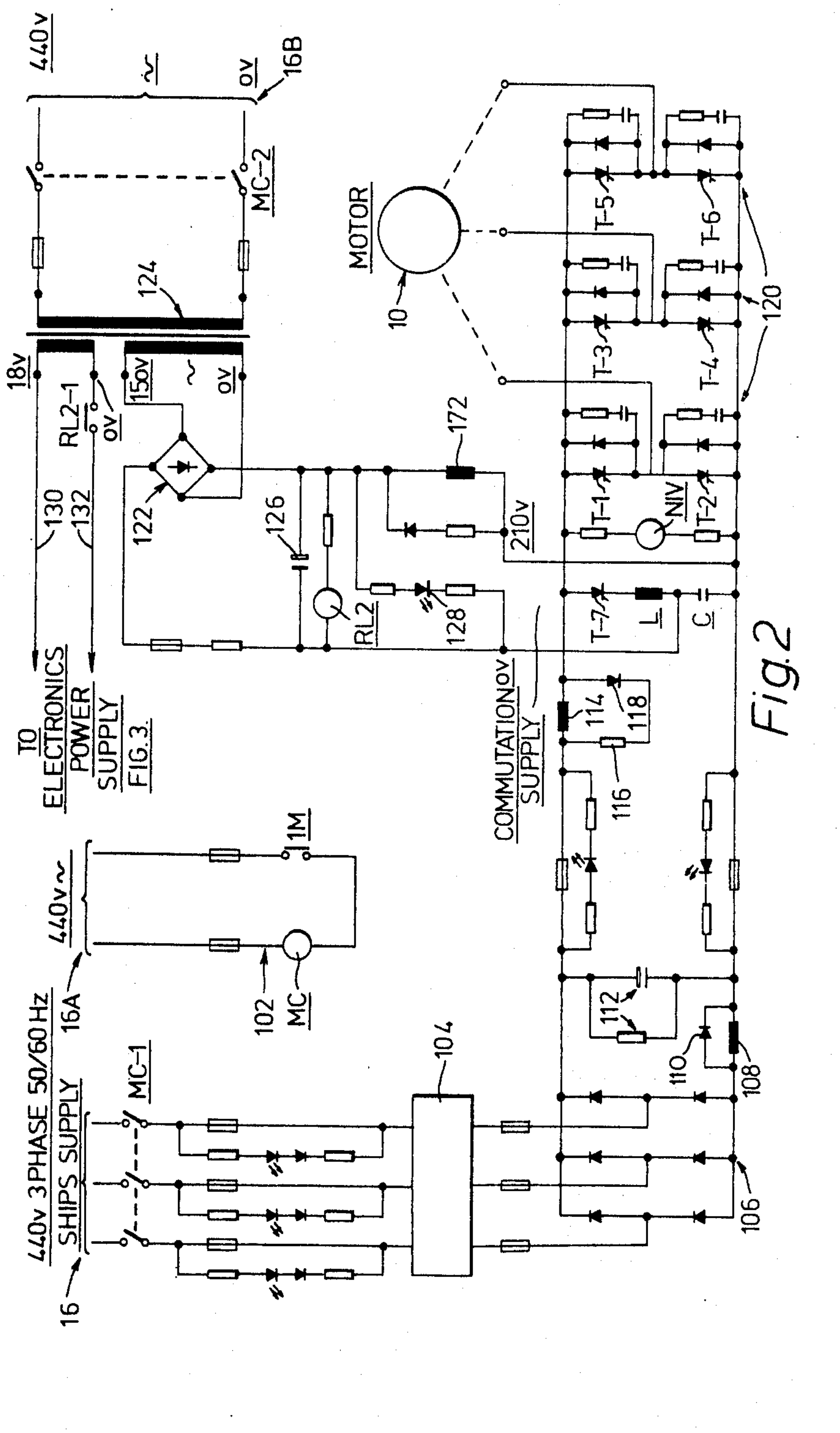
FIG. 2 is a circuit diagram showing part of converter means of the system shown in FIG. 1.
Figure 3:
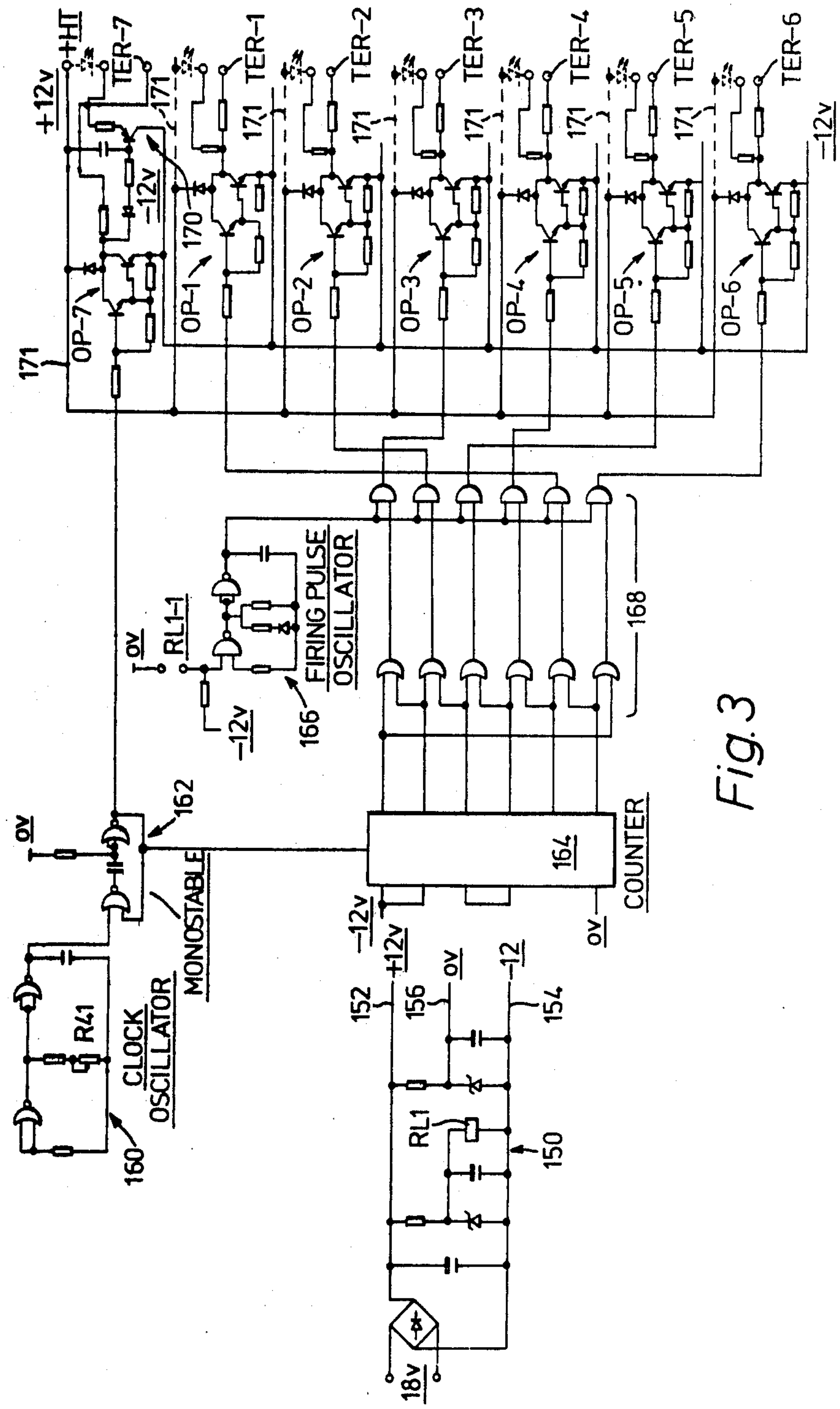
FIG. 3 is a second circuit diagram showing electronic circuitry being a further part of the converter means of the system shown in FIG. 1.

Firstly, however, I give a detailed description of the converter means shown in FIGS. 2 and 3.

FIG. 2 shows the motor 10 and the AC mains supply at 16. The same supply provides sub-supplies 16A and 16B each of 440 volts AC for purposes described below.

The three-phase supply 16 is fed via ganged contactor contacts MC-1 to the converter means 21, the contacts MC-1 being operable by an actuator MC in a circuit 102 including the supply 16A and a contact 1M. The actuator for the contact 1M is not shown but is energised at the control panel 17 referred to above. From the contacts MC-1 the three-phases pass via fuses to step-down transformer means 104. Each fuse has in parallel therewith a fuse failure indicator in the form of a Light Emitter Diode (LED) in series with a reverse voltage protection diode and suitable resistors in generally known manner.

Further fuses connect the three-phase output from the transformer means 104 to a diode rectifier bridge 106. It will be understood that within the transformer housing at 104 there are three sets of contacts selectively operable to provide for a three-phase output of either 20, 25 of 35 volts (r.m.s.) as explained above.

The DC voltage from the bridge 106 is fed via a surge limit inductor 108 with in-parallel diode 110 to a smoothing capacitor circuit 112. Thence, via fuses with LED failure monitors and a surge inductor 114 with damping resistor 116 and diode 118 in parallel, the output is fed to a 3-phase inverter 120 in the form of a thyristor bridge of generally known type made up of six thyristors T-1 to T-6.

The three phase outputs from the bridge arms are fed to respective terminals of the medium speed 8-pole winding 20 of the motor 10, via the contactor 19 (FIG. 1).

The bridge inverter 120 has connected across it a relay NIV with resistors in series designed to respond to a fall to zero in the DC link voltage between the rectifier bridge 106 and the relay. Should the link voltage fall to zero the relay NIV causes a brake to be applied to the winding drum immediately.

A capacitor C in series with inductor L and thyristor T-7 is connected across the inverter 120 to provide commutation pulses for operating the thyristor invertor 120.

The commutation supply is derived via a rectifier bridge 122 from a transformer 124 fed via contacts MC-2 of the actuator MC from the supply 16B. This commutation supply is smoothed by capacitor 126. A relay RL2 responds to fall of voltage to zero to inhibit the electronic circuitry (described below, FIG. 3) which determines the firing sequence of the inverter thyristors T1–T6. The presence of commutation supply is monitored by an LED 128.

A second output winding on the transformer 124 provides energisation for the electronic circuitry shown in FIG. 3. This supply is fed via conductors 130, 132 and the conductor 132 contains a contact RL2-1 of the relay RL2.

FIG. 3 shows the input supply derived from the conductors 130, 132 of FIG. 2 at 150 and being used to provide plus and minus 12 volts at lines 152, 154, respectively, relative to a line 156 at zero volts. The supply circuit includes a relay RL1 which delays operation of a high-speed oscillator described below.

The circuit of FIG. 3 is a further part of the converter means described above and comprises the following principal sub-circuits:

(a) a clock oscillator 160;

(b) a monostable vibrator circuit 162 receiving pulses from the oscillator 160;

(c) a counter 164 receiving pulses from the vibrator 162;

(d) a high-speed firing pulse oscillator 166 controlled by a contact RL1-1 of the relay RL1;

(e) a sequential logic array 168 made up of gate-devices receiving pulses from the counter 164 and the oscillator 166;

(f) six final output stages OP-1 to OP-6 receiving pulses from the array 168 and supplying blocks of firing pulses to the thyristors T-1 to T-6, respectively of the inverter 120 shown in FIG. 2;

(g) a seventh final output stage OP-7 receiving pulses from the vibrator 162 and feeding firing pulses to the commutation thyristor T-7 shown in FIG. 2.

Each output stage OP-1 to OP-7 comprises a transistor power amplifier section.

The output stage OP-7 in addition has an energising circuit 170 for the LED monitoring the presence of the output pulse. This is necessary because the pulse received by the stage OP-7 is very short and is of insufficient duration to energise the LED. Output from each stage is taken across the 12-volt line 171 and the respective terminal TER-1 to TER-7.

OPERATION

The power circuits of the converter means as shown in FIG. 2 will be referred to first.

The three-phase 440 V, 60 hertz, AC supply voltage is transformed down to three secondary voltages which when rectified and smoothed give; 19 V, 26 V and 36 V DC, these corresponding to 33%, 67% and 100% respectively full-load torques.

The thyristor invertor 120 then converts these DC voltages to 2 hertz AC by suitable firing of the thyristors in sequence. The firing sequence to produce 120° conduction is:

(1) T-1 and T-6

(2) T-1 and T-4

(3) T-5 and T-4

(4) T-5 and T-2

(5) T-3 and T-2

(6) T-3 and T-6

Commutation of the thyristors is achieved by resonant turn-off, using the auxiliary supply from the bridge 122 and the commutation thyristor T-7. The resonant components being L and C; L=5 micro-henries and C=100 micro-farrads.

The commutation sequence is as follows:

On switching on, C charges up to the commutation supply voltage minus the link voltage. The net effect is that C is charged to approximately 200 V DC opposite the link voltage. In order to commutate any of the six thyristors in the invertor 120, the commutation thyristor T-7 is fired. This applies a reverse voltage, via the inverter diodes, across the previously-conducting thyristors to turn them off.

The total time period of the commutation circuit is 140 micro-seconds. During this period the 60 micro-henrie choke 114 in the link prevents the link current from rising to unnecessarily high levels.

Once the thyristors have been turned off, the commutation thyristor T-7 is automatically turned off by resonant reversal of voltage and current in the auxiliary circuit. After this, C recharges to 200 V ready for the next commutation sequence. The 1.5 m H choke 172 in the auxiliary circuit protects the circuit from over-current in the same way as that in the link.

The chokes 108 and 114 have fly-wheel diode and resistor combinations across them to dissipate the energy produced in them during the commutation period.

To protect the thyristors from possible commutation failure due to loss of the commutation supply voltage, the relay RL2, is provided and, in the event of loss of this voltage, the relay trips out to switch off the electronics supply and the invertor. A mimic diagram of the power circuit is made up of LEDS across the main fuses. These will only light up if a fuse failure occurs. A LED is also arranged to light up when the commutation supply is on. Observation of these LEDS will aid fault diagnosis, should the need arise.

Turning now to the electronic circuitry of the converter means as shown in FIG. 3, the clock oscillator 160 generates a 12 hertz square-wave which can be varied using the 100 k ohms potentiometer R41. This square wave is then modified using the monostable vibrator 162 to give pulses of 10 micro-seconds length at the clock frequency.

These pulses are used directly to clock the counter 164, which counts every six pulses and then resets. The six output pulses from the counter are used to sequence the firing of the thyristors T-1 to T-6.

The 10 micro-second pulses are also used to fire the commutation thyristors T-7. The thyristors T-1 to T-6 are fired with blocks of pulses at $10^4$ hertz generated by the firing pulse oscillator 166. Each thyristor in the inverter 120 receives pulses for two counts from the counter 164 in the sequence determined by the logic array 168.

The start-up sequence is such that commutation pulses are initiated first followed by initiation of pulses to the T-1 to T-6 thyristors. This is achieved by inhibiting the firing pulse oscillator 166, via RL1, for a short period after switch-on. This prevents the firing of the thyristors T-1 to T-6 in the absence of the facility of commutating those thyristors.

The power supply for the electronics is interlocked to the commutation supply voltage such that it is impossible to fire any of the thyristors if there is a loss of this voltage (see FIG. 1).

For monitoring and fault diagnosis purposes all of the outputs to the thyristors are fitted with LEDS which light up in sequence when the firing pulses are being generated. Current operation of the electronics can thus be seen at a glance by observation of the LEDs.

The low voltage supplied to the invertor 120 by the transformer 104 is such as to produce a flux value in the airgap of the motor equal to the rated flux value at the full mains voltage of 440 volts of the same torque output. The energy crossing the motor airgap is such that the torque required for automatic mooring duty is produced with minimum losses.

The low frequency of supply used for automatic mooring duty will normally be equal to the rated slip-frequency for full rated torque corrsponding to energisation from the normal mains supply, as explained above but in modifications the low frequency may be other than 2 hertz. For example, as a fixed value it may be up to 5 hertz. The precise value depends on the type of motor used and on the number of poles the winding energised produces. Preferably, in all cases as in the example, the frequency is equal to or close to the rated slip-frequency to produce full rated torque. The invention is also applicable to motors for use on two-phase supplies or on supplies of greater than three phase. The frequency used may be varied during motor in-haul running in a modification described below.

The energised winding for automatic mooring duty may be either a stator winding (as in the example described above with reference to the drawings) or in the case of inverted machines it may be a rotor winding. The invention is applicable to systems in which the motor is a squirrel cage type or a wound rotor, type. In the case of wound rotor types, the windings are shorted.

A static inverter is preferred but a mechanical equivalent may be used as an alternative.

Instead of a quasi-square waveform, which is preferred, it is possible to use a square waveform without periods of zero voltage, or to use quasi-sinusoidal or sinusoidal voltage waveforms to energise the motor for automatic mooring duty. A cycle-converter device would be used to produce the required sinusoidal waveform. However, the quasi-square waveform enables simple converter procedures to be used whilst at the same time achieving remarkably low losses in the motor.

The invention is readily applicable as a conversion by way of retrofitting to an existing winch without the need to disturb the existing change-speed energising system.

In another modification the step-down transformer may be dispensed with and instead of a diode rectifying state 106, a continuously variable thyristor stage may be used.

Figure 5:
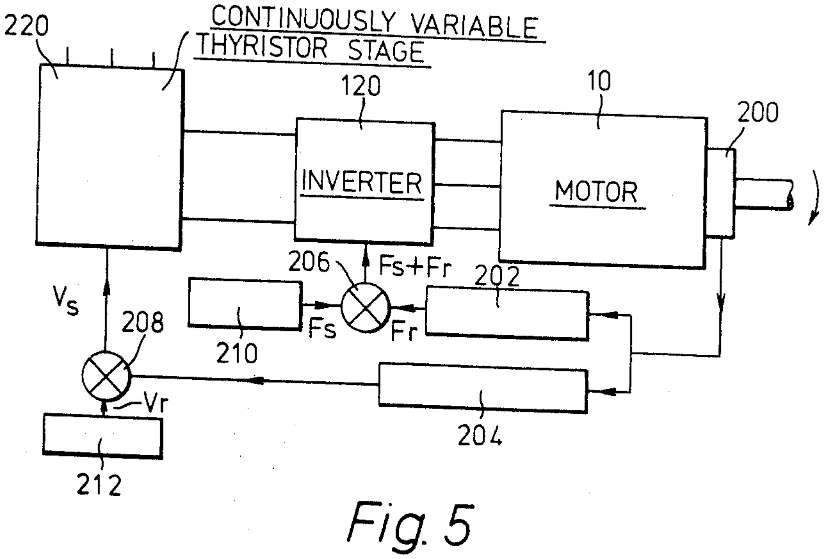
FIG. 5 is a diagrammatic representation of a modification of the system shown in FIG. 1.

FIG. 5 shows a further modification which is particularly relevant to special automatic mooring conditions where water movements produce quite rapid ship movements. For example, ships in passage through the St. Lawrence Seaway use canal locks in which recovery of rope (especially those set as breast lines) during rapid filling of the lock is required to be especially rapid to maintain tension.

The motor 10 has a tachometer or speed sensor device 200, which produces an electric signal which represents speed and which is fed to frequency correction means 202 and voltage correction means 204. Those means 202 and 204 produce electric frequency and voltage correction signals, respectively, which are fed to respective summing means 206 and 208. Preset frequency and voltage signals are produced by respective means 210, 212 and are fed to the summing means 206 and 208, respectively.

The summing means 206, 208 form the algebraic sums of the received signals and feed them, respectively to the invertor 120 and the variable thyristor rectifying stage 220 (replacing the diode stage 106 and transformer described first above).

With this modification, the motor produces constant torque over a range of speeds. Where a square or quasi-square voltage waveform is used a de-rating of some 10% applies because, as the supply frequency aproaches the design frequency extra losses are induced to supply harmonics. If a sinusoidal voltage supply is produced by the convertor means no such de-rating applies and the torque output will be produced up to normal rated speed. When the frequency is varied this way the upper limit may be as high as 30 hertz or more but the motor is energised at such higher frequencies only during in-haul running.

The invention includes a typical practical arrangement in which several winches are fed from a single convertor means for automatic mooring duty.

In the example first described above the energisation of the motor 10 during automatic mooring duty at a frequency of 2 hertz typically gives a mooring rope speed of some 0.013 meters per second (ms) (2.7 feet per minute-f.p.m.) at zero tension and slightly less, say about 0.012 m/s (2.5 f.p.m.) under full set tension. That is applicable to a typical winch having a full rated torque equivalent to 49.8 kN (5 Tons) maximum (i.e. 49.8 kN pull at continuous duty without exceeding the rated temperature limit) and which would for example deliver a rated 18,642.5 watt (25 Horse Power) in the medium speed setting. The winch would exert a pull sufficient to maintain a maximum tension of 49.8 kN at rope speeds up to the value of about 0.01 m/s (2 f.p.m.) mentioned above. Thus, continuous auto-mooring duty is available at those rope speeds which are suitable for most mooring situations.

As mentioned above, the convertor means 21 allows a choice of two lower maximum tensions by switching to alternative stepped-down voltages so that one third (16.53 kN; 1.66 Tons) and two thirds (33.06 kN; 3.32 Tons) values may be set if preferred.

In modifications, other winch maximum horsepowers, torques and rope speeds may be used but in general rope speeds will be quite low (less than 0.05 m/s; 10 f.p.m.) both for in-haul and pay out running.

In situations such as the St. Lawrence seaway in-haul speeds may sometimes have to be relatively greater and then the frequency of supply from the converter means can be varied during in-haul operation up to perhaps 30 hertz or more so as to maintain tension at, or as close as possible to, the set tension. However, even in such situations, whether the motor runs slowly or quickly during pay out (negative sense of running), the frequecny of energisation during pay out is still not more than 5 hertz.

The invention provides for energisatin of the winch motor in all cases in a manner which provides a controlled maximum value for the value of rope tension at which the winch will pay out rope. This is because, as the ship moves away from its correct berthed position the rope tension increases slightly and the motor is forced to pay out rope. This effectively increases the slip-frequency and increases the rotor voltage and rotor current. The increased rotor "ampere-turns" are no longer balanced by the fixed stator current and the field strength decreases. This partly offsets the effect of increasing rotor current. The result is that the characteristic curve representing the relationship between torque and slip-frequency becomes somewhat flattened. In other words, as the resultant slip-frequency increases as the motor pays out rope, the torque produced by the motor stays fairly constant instead of rising. Thus useful tension is maintained very close to the set value.

Although the motor winding means shown comprises three windings in star formation, delta windings may be used instead. The winding means may be a single winding and the output from the converter means would then be fed to the whole of that winding. Such a single winding might be used in a single speed motor. However, as a further alternative a motor may be used having a single winding which for normal mooring duty is fed from a variable source of supply, such as an inverter, so that continuous speed variation is available for normal mooring. The inverter means described above, or the modifications for producing other waveforms such as cyclo-convertor, are readily compatible with such other forms of supply for normal mooring duty.

In general, mains supplies of any suitable voltage may be used. Typically, voltages of 380–550 V may be used.

In another modification, the polyphase voltage produced by the converter means may be of pulse-width modulated wave form. In that case, the resultant motor current wave form is a synthesised sinusoidal type. As further modifications the converter may produce sinusoidal or quasi-sinusoidal polyphase voltage output.

A further modification of the mooring winch system will now be described with reference to FIG. 6, which shows a system which has several features in common with the systems already described.

Figure 6:
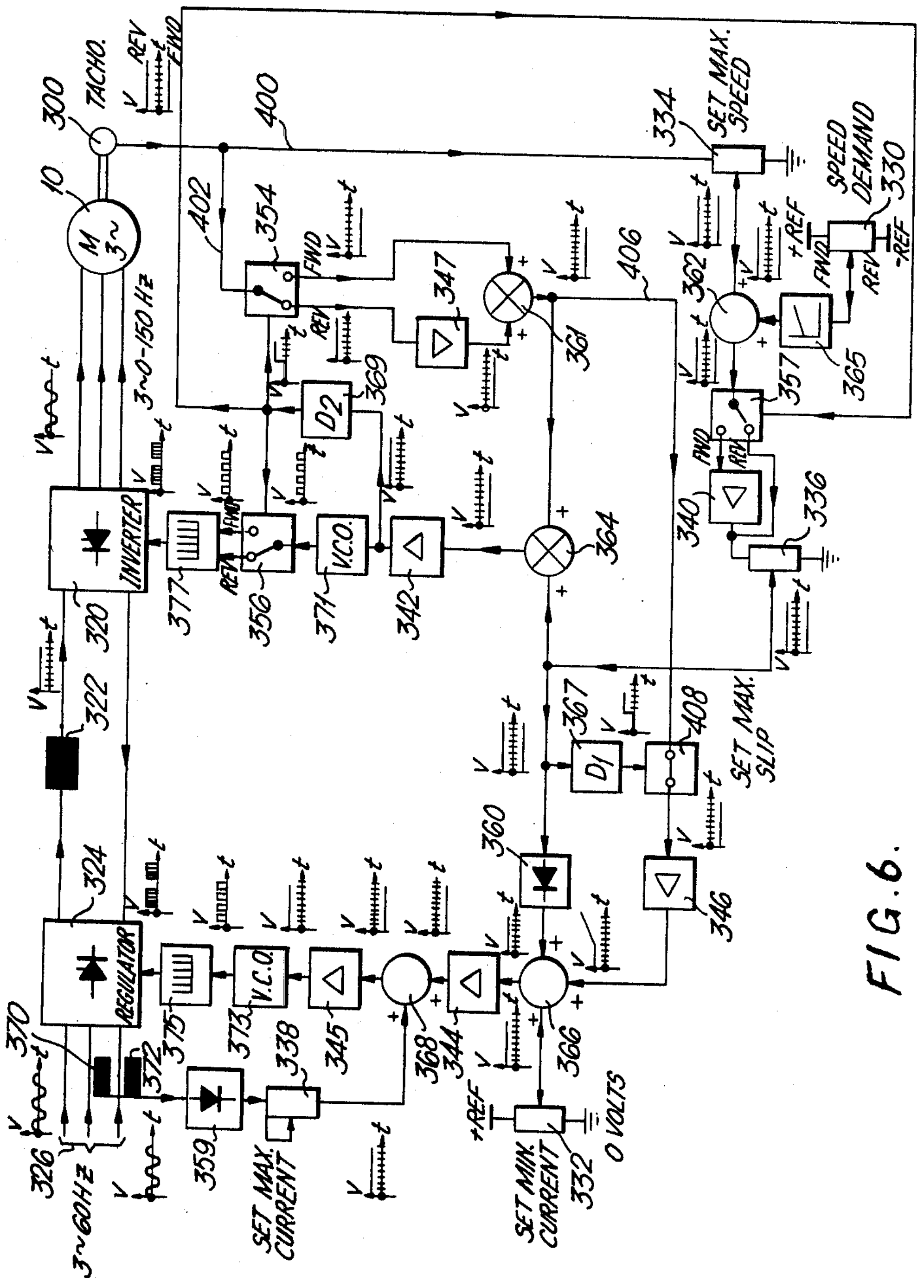
FIG. 6 is a diagrammatic representation of another embodiment of system.

FIG. 6 shows a system in which there is an AC squirrel cage winch motor 10 which drives a tachogenerator 300. The motor 10 is supplied with a quasi-squarewave current by an inverter 320 which is similar to the inverter 120 disclosed above, but which in this case is a current source inverter rather than a voltage source inverter as previously described.

The inverter 320 is fed via an inductor 322 from a DC constant current, variable voltage regulator 324, which is connected to an AC 3-phase supply at 326.

The inverter 320 is similar generally to the inverter 120 described above and has six thyristors arranged in a bridge circuit and fired by pulses supplied from an electronic timing circuit as already described. It is not therefore necessary to give a detailed explanation of the inverter 320, nor of the DC regulator which is similar to the rectifier bridge circuit 106 and related circuitry already described.

The frequency of the output of the inverter 320 is variable and a feedback voltage signal is derived by the tachogenerator 300 which is proportional to the speed of the winch motor 10. The feedback signal is used to determine the speed of the winch motor 10.

The signal is also used to control the DC regulator 324.

The system includes a manually adjustable means 330 to impose a "speed demand" which, during manual control of the winch for duties other than automatic mooring, is used for changing the speed and sense of rotation of the winch. The same control is set to maximum speed in the rope in-haul sense when the system is set for automatic mooring duty.

The "speed demand" means imposes a slip-frequency demand which is also fed to the current control so that the output current from the inverter 320 is directly proportional to the magnitude of the slip-frequency demand.

The minimum output current from the inverter 320 is set by a "minimum current" control 332 which is dependent of the slip-frequency.

The output current from the inverter 320 is maintained at the level demanded by comparing the demanded current value with the value of the current drawn from the mains supply and regulating the current fed to the inverter so as to reduce the difference to zero. In other words, a current value feedback control is imposed in addition to a speed-value feedback control.

It is sufficient for the control signal system to be described qualitatively with reference to FIG. 6 because the details of circuits necessary to derive, compare and apply the various signals are known.

In FIG. 6 the following components make up the control signal system: variable potentiometers 330, 332, 334 and 336 to provide means for adjusting voltage reference levels; a variable resistor 338 representing an adjustable upper current limit; solid state amplifier circuit device 340, 342, 344, 345, 346 and 347 typically of type 741 or 747; solid-state switching devices 354, 356 and 357 typically of types 4016 or 4019; a solid state device 358 of type 4046; rectifying devices 359 and 360; and solid state summing junction devices 361, 362, 364, 366 and 368; a ramp device 365; detector devices 367 and 369 the first controlling a switch device 408 and the second controlling the switching devices 354, 356 and 357; two voltage-controlled oscillators 371 and 373; and two driver devices 375 and 377.

There are current transformers 370, 372 to provide a current feedback signal.

The maximum speed of the winch motor 10 can be set by adjustment of the potentiometer 334. The maximum slip-frequency can be set by adjustment of the potentiometer 336.

The signal from the tachogenerator 300 is fed along a first route 400 via the potentiometer 334 and the junction 362 to the switching device 357. Tthe signal then goes either directly to the potentiometer 336 or is inverted via the amplifier 340, depending on the condition of the switching device 357.

The signal from the potentiometer 336 is fed directly to the summing junction 364 and to the summing junction 366 via the rectifier device 360.

The signal from the tachogenerator 300 is fed along a second route 402 via the switch device 354 to the summing junction 361, the signal passing either directly to the junction 364 or being inverted by the amplifier 347, depending on the condition of the switching device 354.

Thus, the summing junction 364 receives a first signal via the route 400 which represents the difference between the actual speed of the motor 10 and the demanded speed as set at 334. This differece is driven by the junction 362. This first signal is also representative of the direction of rotation of the motor 10 as set at 330.

A second signal input is received by the junction 364 via the route 402, which represents the actual speed of the motor 10.

The output from the summing junction 364 is fed via the devices 342 to the device 377 where DC voltage pulses are produced at a repetition frequency which is dependent upon the voltage level of the signal produced by the junction 364. The pulses are fed to the inverter 320 and used to fire the thyristors in the inverter. The sequence of firing is determined by the polarity of the signal produced by the junction 364. This determines the phase of the supply fed to the motor 10. The automatic mooring setting is one in which the motor is energised so that if free of load it would run in the rope in-haul sense. When the repetition frequency of the pulses from the device 371 falls to 0.1 hertz during the automatic mooring duty, the device 369 produces an output signal in the form of DC voltage pulses which is used to cause the devices 354 and 356 to switch over from one state to the other.

The switch-over of the device 356 changes the sequence of the firing pulses fed to the inverter 320 so that the phase of the supply fed to the motor 10 is reversed.

The switch-over of the device 354 is effected so that the signal from the tachogenerator 300 passing along the route 402 is inverted when necessary to ensure that, regardless of the sense of motor rotation, the signal received by the junction 364 from the junction 361 is always of the same polarity.

The switch over of the device 357 is effected so that when, say, forward rotation of the motor 10 is demanded at 330 the signal is passed through the inverting amplifier 340 but when reverse rotation is demanded the signal is passed directly to the potentiometer 336, and thence to the summing junction 364.

The device 365 ensures that excessively rapid change in the direction of rotation demand at 330 does not adversely affect the system. The device 365 ensures a relatively uniform rate of change of signal, whatever the rate of change of setting of the device 330.

The signal representing the actual speed of the motor 10 is fed along the route 406 via the switching device 408 (responsive to signals from the device 367) and the amplifier device 346. The device 367 is operable only when the demanded speed signal set at 330 exceeds a certain value. Operation of the detector device 367 causes the device 408 to pass a signal to the amplifier 346, which signal is added at the junction 366 to the speed demand signal. In this way the non-linearity of the operating characteristic of the motor 10 can be taken into account.

The junction 366 compares the demanded current, as represented by the voltage signal derived from the tachogenerator, with the minimum current value set at 332 and produces an output voltage signal accordingly. This output is amplified by the device 344 and fed to the summing junction 368.

The junction 368 compares the effective demanded current signal, received from the device 344, with the value of current drawn from the mains supply which value is detected by the transformers 370 and 372. A rectified AC voltage is derived from the output of those transformers by the device 359 and fed via the variable resistor 338 to the junction 368.

The output from the junction 368 is amplified by the device 345 and fed to the regulator 324 where it is used to control the regulator in a manner to reduce to zero the difference between the demanded current and the actual current drawn.

OPERATION

(a) Automatic Mooring Duty

When the system is set for automatic mooring the control 330 is set to maximum rope in-haul speed. That is, the potentiometer sliding contact is moved to the extreme positive voltage end of the potentiometer. The central position represents zero speed signal i.e. motor de-energised, and the opposite extreme position represents full-speed rope pay-out energisation of the motor. The demanded motor speed is proportional to the distance the potentiometer slider is displaced from the central position.

The winch will then haul in rope until the tension in the rope reaches the set tension. The motor then stalls; that is the motor 10 ceases to turn but is still energised in the rope in-haul sense and is developing torque continuously in that sense. The motor 10 is energised at a frequency of say 2 hertz at which the winch can deliver the set tension continuously without overheating.

The signal from the tachogenerator is now zero. The signal from the "speed demand" potentiometer 330 is the sole control signal present. From that signal, control signals for the invertor 320 and the regulator 324 are derived in a manner to maintain constant energisation of the motor 10.

If the water level changes so as to cause the mooring rope tension to tend to decrease the winch immediately turns in the rope in-haul sense. A signal is now generated by the tachogenerator 300. The signal is positive because the direction of rotation is in the in-haul sense.

The more quickly the ships' motion tends to reduce tension. the more quickly does the winch turn. The tachogenerator also accelerates in accordance with the winch motion and the signal it produces has a magnitude which represents the speed of the winch at each instant. The generated signal represents an increase in "speed demand" and the invertor thyristors are fired now in a rapidly accelerated sequence so that the motor 10 is energised at an increased frequency. The "speed demand" signal which is fed back as described has the effect of increasing the frequency of supply so as always to tend to reduce the slip-frequency so as to restore it to the rated value of some 2 hertz.

Once this slip-frequency is re-established the motor speed remains constant.

The winch recovers rope so as to maintain tension and until the ship's movement decreases and the rope tension is restored once more to the "set" value. The speed of winch rotation then decreases to zero. The signal from the tachogenerator also decreases to zero and the frequency of energisation of the motor is accordingly reduced so as to preserve the rated value of the slip-frequency. Throughout this phase of operation the tension is maintained substantially constant.

Should the ship's movement due to water movement or wind force be such that the tension in the rope increases very slightly above the stalled tension, the winch turns in the rope pay-out sense. The motor 10 is forced to turn opposite to the sense of energisation.

However, the motor still delivers torque and maintains the rope tension at a value very close to the set value. As the motor turns in the rope payout sense, the tachogenerator produces a negative voltage signal which reduces the "demanded speed" signal. As a result the frequency of repetition of the pulses from the device 371 is reduced. The frequency of supply to the motor is reduced.

Should the speed of motor rotation in the rope pay-out sense reach a sufficient value the frequency of pulse-repetition at the output of the oscillator 371 falls to 0.1 hertz so that the output from the amplifier 342 suddenly switches to full negative output which is detected by the device 369, causing switching over of the devices 354, 356 and 357.

The firing sequence of the thyristors of the invertor 320 is changed so that the phase of the supply is reversed.

The change-over of the device 354 causes the negative voltage signal from the tachogenerator 300 to pass through the inverting amplifier 347 to produce a positive signal at the junction 364.

The change-over of the device 357 causes the output from the junction 362 to be switched through the inverting amplifier 340, to compensate for the change in polarity of the signal from the tachogenerator 300. The result of this is that as the motor speed increases as the ship's movement continues, rope being paid out, the slip-frequency being sensed by the system is a negative slip-frequency and the system responds in a manner to maintain the magnitude of the negative slip-frequency at the rated value. The motor is supplied with an increasing frequency as the motor speed increases, the frequency being sensed by the system in a negative slip-frequency and the system responds in a manner to maintain the magnitude of the negative slip-frequency at the rated value. The motor is supplied with an increasing frequency as the motor speed increases, the frequency being such that the motor continues to provide torque in the rope in-haul sense which resists the motion of the winch drum; the winch is now functioning in a manner analogous to an electric hoist when it lowers a load. This mode of operation is known as the "fourth quadrant" mode. Energy is being fed by the ship into the winch system and the inverter supply passes energy into the mains supply.

The system may be arranged to provide a constant resisting torque as rope is paid out so preserving a constant tension in the mooring rope. As an alternative, the system may be arranged to provide increasing resisting torque as rope is paid out so causing the rope tension to increase. Ultimately the rope tension must be limited for safety and the system will be arranged to prevent the torque from exceeding a safe value.

When the ship's motion subsides the rope tension falls and the motor speed falls too. The signal from the tachogenerator 300 decreases so that the frequency of supply is decreased accordingly.

Ultimately, the frequency of repetition of the pulses produced by the device 371 falls to 0.1 hertz, the detector 369 responds and causes the devices 354, 356 and 357 to be switched back to their original condition.

Should the ship's motion continue in the same sense, the winch will rotate in the rope in-haul sense to recover rope and maintain substantially constant tension in the rope. The ship will then tend to remain in a fixed position or move closer to its original berthed position.

During normal conditions when the winch is set for automatic mooring duty the ship's movements will be relatively slow and of relatively small amplitude, as already explained in relation to the earlier embodiments.

The relationship between the tension in the rope and the speed of rotation of the motor 10 in the embodiment described with reference to FIG. 6 may be such that the tension in the rope can be maintained constant or, alternatively, be increased as the winch is forced to pay out rope as mentioned above.

When the winch is recovering rope the system preferably maintains the set tension; but if preferred some other relationship may be chosen.

(b) Other mooring duty

The winch system described with reference to FIG. 6 performs non-automatic mooring or other duty, the direction and speed of the motor 10 being controlled manually by adjustment of the potentiometer 330.

When rope is first being taken out for initial securing to the berth, the winch can be set for rope pay-out by movement of the slider of the potentiometer 330 towards the negative end of the potentiometer up to maximum rope pay-out speed.

In all of the systems described above the winch motor is energised continuously during automatic mooring duty so as to produce torque in the rope in-haul sense. So long as the motor is stationary (that is stalled) the motor remains energised in the sense that the motor would, if unloaded, turn in the rope in-haul sense. The same sense of energisation persists while ship's movements require rope to be hauled in. Even when the ship's motion causes the winch to pay out rope the winch motor continuously exerts torque which resists the rope's outgoing motion and so tension in the rope is maintained.

The systems are all characterised by energisation of the winch motor at very low frequency of the order of the slip-frequency of the motor for normal rated duty during automatic mooring duty at all commonly encountered relatively slow ship movements. Higher speed ship movements are automatically altered for, as described above.

In all the systems described above, while the motor is stalled i.e. stationary, the stator field is rotating, say clockwise for example, at a frequency equal to or close to the slip-frequency for rated performance of the motor.

That means that the effective slip-frequency for the motor during that duty is negative and of a magnitude such that torque is developed in the rotor sufficient to haul rope in and maintain the rated set tension.

If the field in the stator is stationary, the same tension can be maintained if the rotor turns in the rope pay-out sense at the rated slip-frequency.

For higher rope pay-out speeds, to maintain full tension, it is necessary that the stator field rotate in the same sense as, but slower than, the rotor so that the effective slip-frequency is still negative and of such magnitude that torque is developed in the rotor resisting rope pay-out and sufficient to maintain rope tension at the rated set tension, even though the rotor is in fact rotating in the rope pay-out sense. This is the "fourth-quadrant" mode of operation referred to above, in relation to the system described with reference to FIG. 6.

What is claimed is:

1. An automatic mooring winch system comprising a winch having a winding drum and a polyphase AC motor in driving relationship with the winding drum, an AC polyphase electric power source, converter means comprising rectifier means and inverter means, further means to connect said converter means between said motor and said power source, speed-responsive means in driving relationship with said AC motor and operble to produce a first signal corresponding to motor speed, frequency-correction means and voltage-correction means arranged to receive said first signal and to produce, respectively, frequency-correction and voltage-correction signals, said inverter means and said rectifier means being arranged to receive said frequency-correction and voltage-correction signals, and electronic detector means responsive to a reduction of said frequency correction signal to a pre-set value to change the mode of operation of said inverter to change the phase of energisation of said motor whereby said motor exerts torque in the rope in-haul sense while said motor runs in the rope pay-out sense.

2. An automatic mooring winch system comprising a winch having a winding drum and a three-phase squirrel-cage AC motor in driving relationship with the winding drum, a 3-phase AC electric power source, converter means comprising a solid-state rectifier means and solid-state thyristor inverter means, means to connect said converter means between said motor and said power source, said rectifier means being operable to step down the voltage of said source and to supply stepped-down voltage to said inverter means, which is operable to produce 3-phase quasi-square waveform at a frequency less than 5 hertz which frequency is substantially equal to the rated slip-frequency of the motor.

3. In an automatic mooring winch system comprising a winch having a winding drum and a polyphase AC motor in driving relationship therewith and an AC polyphase electric power source, the improvement comprising converter means, including rectifier means and inverter means, and means to connect said converter means between said motor and said power source and said converter means being operable to energise said motor continuously for automatic mooring duties while said motor is stalled at a frequency of the same order as the slip frequency of the motor for full rated duty.

4. In the system according to claim 3, the further improvements comprising arranging said converter means to be controllable automatically in response to motor speed and direction to energise said motor continuously to produce torque in the rope in-haul sense for automatic mooring duties.

5. In an automatic mooring winch system comprising a winch having a winding drum and a polyphase AC motor in driving relationship therewith and an AC polyphase electric power source, the improvement comprising converter means, including rectifier means and inverter means, means responsive to motor speed providing feed-back control of said inverter means and means providing current feed-back control of said rectifier means.

6. In the system according to claim 5, the further improvement comprising detector means responsive to motor speed in the rope pay-out sense above a predetermined value to initiate change of phase of energisation of the motor to produce torque therefrom in the rope in-haul sense.

7. An automatic mooring winch system comprising a winch having a winding drum and a polyphase AC motor in driving relationship with the winding drum, an AC polyphase electric power source, converter means comprising rectifier means and inverter means, further means to connect said converter means between said motor and said power source, speed-responsive means in driving relationship with said AC motor and operable to produce a first signal corresponding to motor speed, and frequency-correction means and voltage-correction means arranged to receive said first signal and to produce, respectively, frequency-correction and voltage-correction signals, said inverter means and said rectifier means being arranged to receive said frequency-correction and voltage-correction signals and to respond thereto so as to maintain the torque output of said motor at a constant value at all speeds at least in the rope in-haul sesne of rotation of the motor.

8. An automatic mooring winch system comprising a winch having a winding drum and a polyphase AC motor having multiple polyphase winding means in driving relationship with the winding drum, an AC polyphase electric power source, converter means comprising rectifier means and inverter means, and further means to connect said converter means between said motor and said power source, said further means being operable selectively to connect said multiple polyphase winding means to said electric power source for manual mooring duties or to connect said converter means between said source and one polyphase winding means of said multiple polyphase winding means for automatic mooring duties.

* * * * *